INFORMATION TRANSLATING APPARATUS

Filed Dec. 3, 1962 5 Sheets-Sheet 1

INVENTORS
ELVIN D. SIMSHAUSER &
ROSS M. CARRELL
BY Morris A. Rabkin
ATTORNEY

Nov. 15, 1966 E. D. SIMSHAUSER ETAL 3,286,029

INFORMATION TRANSLATING APPARATUS

Filed Dec. 3, 1962 5 Sheets-Sheet 2

INVENTORS
ELVIN D. SIMSHAUSER
& ROSS M. CARRELL
BY Morris A. Rabkin
ATTORNEY

INFORMATION TRANSLATING APPARATUS

Filed Dec. 3, 1962 5 Sheets-Sheet 3

INVENTORS
ELVIN D. SIMSHAUSER &
ROSS M. CARRELL
BY Morris L. Rabkin
ATTORNEY

INFORMATION TRANSLATING APPARATUS

Filed Dec. 3, 1962 5 Sheets-Sheet 4

INVENTORS
ELVIN D. SIMSHAUSER
& ROSS M. CARRELL
BY Morris Rabkin
ATTORNEY

Nov. 15, 1966 E. D. SIMSHAUSER ETAL 3,286,029

INFORMATION TRANSLATING APPARATUS

Filed Dec. 3, 1962 5 Sheets-Sheet 5

INVENTORS
ELVIN D. SIMSHAUSER &
ROSS M. CARRELL

BY Morris B. Rakkin

ATTORNEY

United States Patent Office 3,286,029

Patented Nov. 15, 1966

3,286,029

INFORMATION TRANSLATING APPARATUS

Elvin D. Simshauser, Merchantville, and Ross M. Carrell, Haddonfield, N.J., assignors to Radio Corporation of America, a corporation of Delaware Filed Dec. 3, 1962, Ser. No. 241,756
8 Claims. (Cl. 178—30)

The present invention relates to information translating apparatus, and particularly to apparatus for forming legible characters from coded information which represents these characters.

The invention is especially suitable for use in electronic data processing apparatus, and may be embodied in a printer for forming alpha-numeric characters in response to digital information from the output of a computer or other electronic data processing device. The invention may also be used in communications apparatus to provide printed copies of messages which are transmitted over a communications link, such as a radio transmission channel or a telephone line.

Several types of printers are available for printing characters corresponding to digital information represented by electrical signals. Most of these printers involve complex mechanisms and occupy large areas. Because of their complexity, many available printers are expensive. Moreover, the cost of most printers increases with their speed of operation. High printing speed, in terms of characters or words printed per minute, is highly desirable in order to make efficient use of a computer or communications link which is capable of providing characters at very high rates. Electrical or electronic printers, as opposed to solely mechanical printers, are also available. Some of these electrical printers also require complex electronic equipment for their operation. Many electrical and electronic printers cannot readily provide several copies of the documents which they produce. The copies may also not be printed on separate pages, but rather along strips of paper.

Accordingly, it is an object of the present invention to provide improved apparatus for forming legible characters in response to coded information and which will not be subject to the aforementioned and other limitations of members known heretofore.

It is a further object of the present invention to provide an improved apparatus for printing characters in response to coded information delivered thereto at high speed, as from a communications link or from electronic data processing apparatus.

It is a still further object of the present invention to provide an improved printer which is compact in size and does not require a large amount of space.

It is a still further object of the present invention to provide an improved printer which is capable of printing characters at very high speed and yet is relatively low in cost as compared to high speed printers which are presently available.

It is a still further object of the present invention to provide an improved printer wherein the timing and coordination of information handling and printing functions are readily accomplished by simple means.

It is a still further object of the present invention to provide an improved printer for translating digital information into printed documents and which may provide documents of page length, and also may simultaneously make multiple copies of such documents.

Briefly described, the invention, as embodied in apparatus for printing characters in response to coded information representing such characters, may include means for storing information representing the bits of successive characters, means for controlling the transfer of the information to the information storage means, and a printing device for forming legible characters on a document in response to the stored information. Means are provided for mechanically transporting the document and the printing device so that the device scans the document as the document moves past the device and prints successive lines of characters on the document. Cyclically operative means are provided for the timing and coordinating all information handling, printing, and mechanical transporting operations of the apparatus. The cyclically operative means may be operative asynchronously with the arrival of successive characters of the information at the apparatus. Included in the cyclically operative means may be an electromechanical pulse generator for providing repetitive sequences of high power electrical pulses which; (1) read-out the information storage means into the printing device, (2) energize the printing device to print on the document when information is read out of the storage means, (3) control the transfer of information to the storage means only when the latter is ready to accept information, (4) control the transport means to drive the document and the printing device, and (5) provide electrical power for operating the circuits of the apparatus.

The invention itself, both as to its organization and method of operation, as well as additional objects and advantages thereof, will best be understood from the following description when read in connection with the accompanying drawings, in which.

*The printing system in general*

Figure 1:
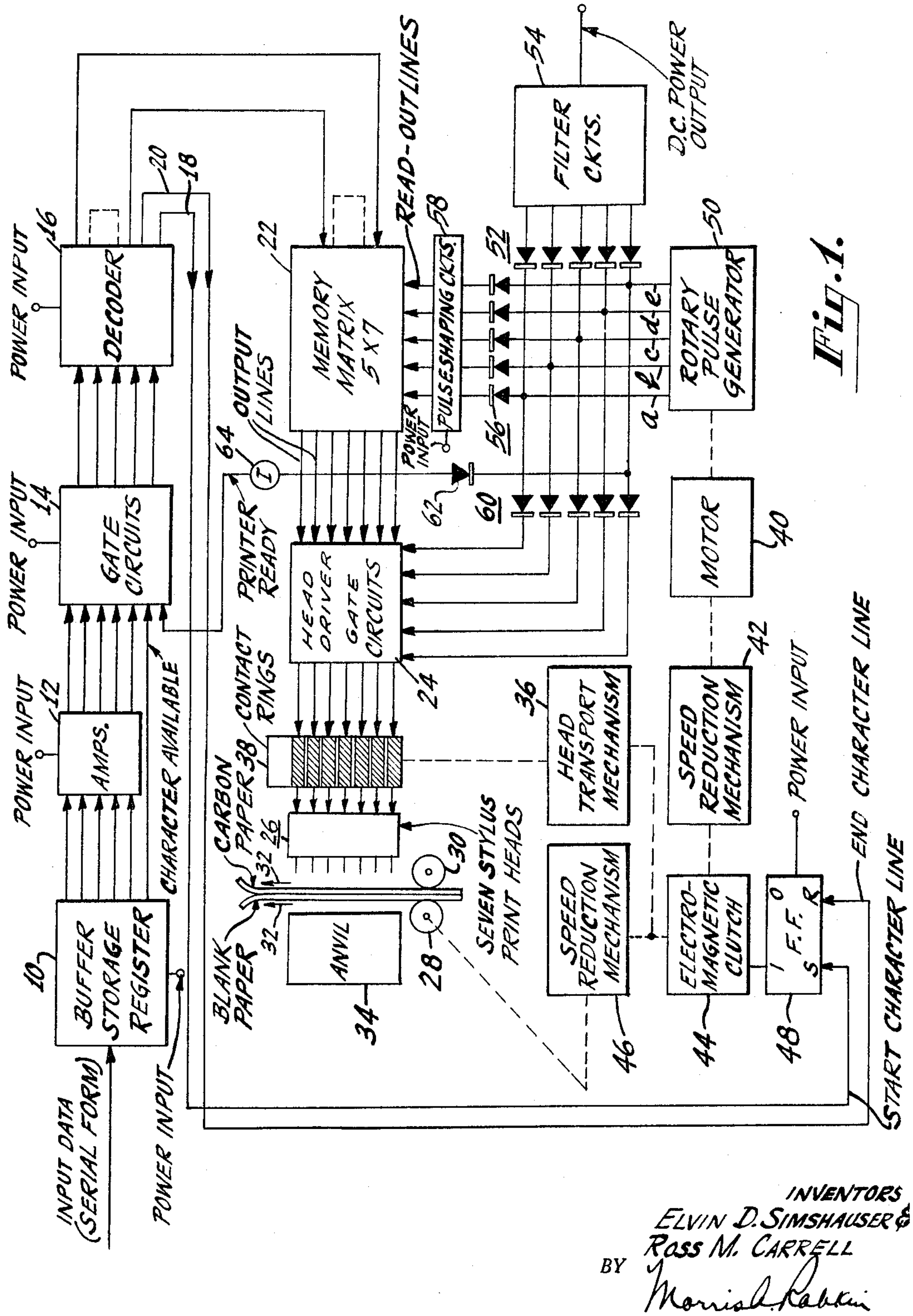
FIG. 1 is a block diagram schematically illustrating a printer embodying the invention.

Referring more particularly to FIG. 1, there is shown a buffer storage register 10 which is adapted to receive input data which may arrive asynchronously at varying data rates. The data may arrive from a communication link or an electronic data processing device in serial form, that is, the bits which make up the characters of the message to be printed arrive sequentially. Groups of bits (five bits, for example) may constitute a character of information in accordance with the Baudot code. These characters may be alpha-numeric. The system is, however, operative to print any symbol which may be represented by the input data. Thus, the term "character" includes alpha-numeric and other symbolic representations of information.

The buffer storage register 10 may be a shift register of the type also known as a staticizer which converts the data from serial to parallel form. Thus, the five bits which represent a character appear simultaneously at the output of the register and may be transmitted over five parallel bit channels. The buffer register 10 may also include a delay line, such as a magnetostriction delay line, with associated circuits which insert the bits of a character into the line, recirculate the bits through the line, and extract the characters when a character is required by the printer. The presence of a character at the output of the register 10 is indicated by an output signal from the register on a line labeled "character available" in the drawing. Since the foregoing types of buffer storage registers which may be used as the buffer storage register 10 are known in the art, they are not described in detail herein.

Amplifiers 12 in the bit channels may be used to amplify the electrical signals representing bits which are transmitted along the bit channels from the output of the buffer storage register 10. The outputs of these amplifiers 12 are connected to inputs of gate circuits 14, which may be of the AND gate type. These gate circuits each have three inputs. One is from the output of a channel amplifier 12. Another input to each of the gate circuits 14 is applied when the printer is ready to print a character. This input is labeled "printer ready" in FIG. 1. The character available signal from the output of the buffer storage register 10 is also applied to the third input of each of the gate circuits. Accordingly, the gate circuits 14 are only enabled when bit signals, character available signals and the printer ready signals are applied to the inputs of their gate circuits.

The output of the gate circuits 14 is applied to a decoder 16 which recognizes the bit signals and provides a signal on one of a plurality of outputs which corresponds to the character or to a command represented by the combination of bit signals applied to its input. When a combination of bits representing the command to start the printing of a message arrives, the decoder 16 provides an output on a line 18. The combination of bits representing the command to start the message is called a "start character" and line 18 is designated as the "start character line." Similarly, a bit combination representing the end of a message which commands the printer to stop is called an "end character." When an end character is applied to the input of the decoder 16, an output line 20, called the "end character line," has a signal applied thereto. The decoder may be of the type known in the art and used in computer systems. For example, the decoder may include a relay tree switching arrangement. Alternatively, a magnetic core type decoder may be used.

Figure 13:
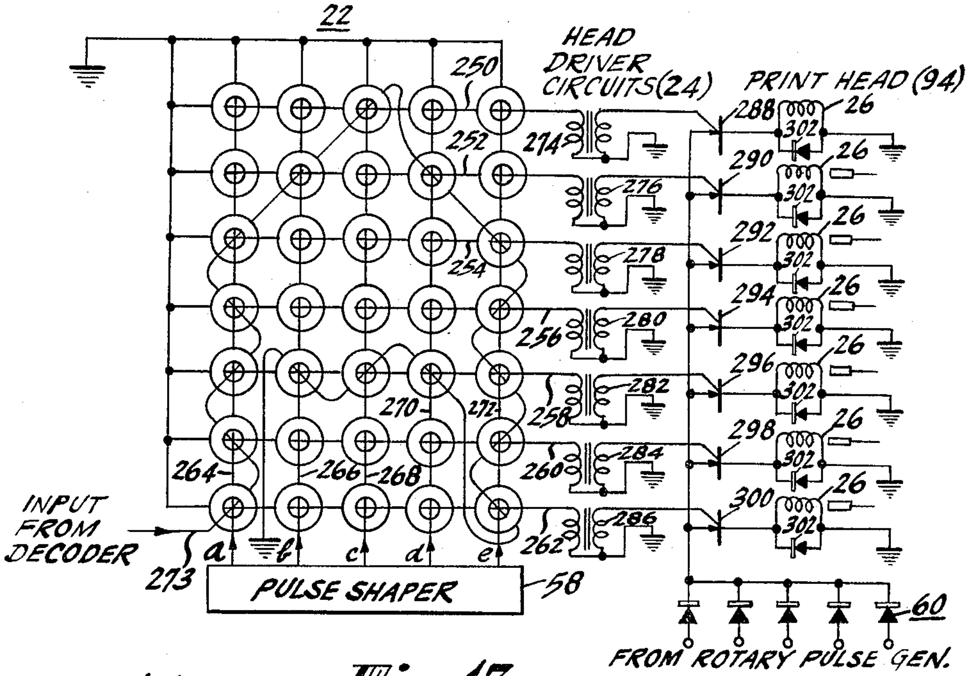
FIG. 13 is a circuit diagram schematically showing a memory matrix, a printing head and print head driver circuits of the printing apparatus shown in FIG. 1.

Those output lines from the decoder which are energized when different characters are applied to the input of the decoder, and which correspond to these different characters, are applied to the inputs of a memory matrix 22. This memory matrix may include a plurality of cores arranged in rows and columns, as shown in FIG. 13. Each of the character corresponding outputs from the decoder is connected to a different input winding of the matrix. These input windings thread the cores in a manner to form patterns corresponding to different arrangements of rows and columns of dots which depict the characters. Output windings, each common to cores in the matrix which correspond to a different row of dots of the characters, are connected to head driver circuits 24 (also shown in FIG. 13) by way of output lines. Read-out windings, each common to cores of the matrix 22 which correspond to a different column of dots in the matrix, are energized separately and successively by way of read-out lines which are connected to the matrix 22.

The head driver circuits 24 are connected through a contactor arrangement 38 to mechanically movable print heads 26. The driver circuits 24 may be gate circuits wherein the signals from the output lines enable the application of drive pulses which energize the print heads 26.

The print heads are illustrated in FIGS. 5 to 8 and will be described in detail hereinafter. Briefly, they include a plurality of impact elements, referred to herein as styli, driven independently by seven magnetic core structures each of which includes a coil which is energized by the pulses from the head driver circuits 24. The styli of the heads 26 may normally be in contact with interleaved sheets of blank document paper and carbon paper. When a pulse is applied to the coil which controls a stylus, that stylus is driven against and impacts the interleaved sheets against an anvil 34 to form a dot on the document paper.

Figure 14:
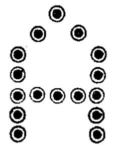
FIG. 14 is an illustration of the form of the character "A" printed by the apparatus illustrated in the foregoing figures.

The document and carbon papers may be transported by means of a mechanism shown schematically as a pair of rollers 28 and 30 which may be in the nature of capstan and pinch rollers, respectively. The print heads 26 are scanned across the document and carbon papers by a head transport mechanism 36. Columns of dots corresponding to the character stored in the matrix 22 are printed successively to form the character. FIG. 14 illustrates, in a form somewhat exaggerated by enlargement, the character "A" as that character may be formed by one of the print heads 26 on the blank paper.

The document transport mechanism and the print head transport mechanism 36 may be driven by the same electric motor 40 (for example, a synchronous motor) which is energized from alternating current power lines. The shaft of this motor drives a speed reduction mechanism 42. The output of the speed reduction mechanism 42 is fed through an electromagnetic clutch 44 to another speed reduction mechanism 46 which provides power to feed the document (for example, by being coupled to the rollers 28 and 30). The magnetic clutch also controls the application of power to the head transport mechanism 36 which drives the print heads 26 across the document. Accordingly, the document moves longitudinally in the direction shown by the arrows 32 while the heads 26 move transversely across the document. The head transport may be arranged to move the heads 26 along a path slightly askew to a line perpendicular to the direction of motion of the blank paper which constitutes the document (see FIG. 4). The text therefore is printed perpendicularly to the direction of motion of the document, which direction is also parallel to the edge of the document.

The electromagnetic clutch is controlled by a flip-flop circuit 48. This flip-flop circuit 48 is of the type known in the art having set and reset inputs. The flip-flop also has a "one" output on which a signal level appears when the flip-flop is set and from which the signal level disappears when the flip-flop is reset. The "one" output of the flip-flop is connected to the electromagnetic clutch 44. The start character line is connected to the "set" input of the flip-flop 44 and the end character line is connected to the "reset" input thereof. Thus, when a start character is applied to the decoder the flip-flop 48 is set, thus causing the electromagnetic clutch 44 to engage. The speed reduction mechanism 42 is then coupled through the clutch 44 to the document transport speed reduction mechanism 46 and to the head transport mechanism 36. The document and the head therefore move when commanded by a start character. The end character resets the flip-flop 48 and causes the electromagnetic clutch to disengage the speed reduction mechanism 42 from the mechanisms 36 and 46 which drive the heads 26 and the document, respectively. As will be more fully explained hereinafter, the application of a start character or end character signal to the decoder is synchronized with the information handling and printing operations by synchronizing means also to be discussed hereinafter. Thus, the motion of the heads and the feed of the document are coordinated with information handling and printing functions.

It may be desirable for the printer to start each message at the beginning of a line. A switch may be included in the head transport mechanism 36 which is normally open and which closes when a print head passes the end of a line on the document. The end character line 20 is connected to the set input of another flip-flop (not shown) similar to the flip-flop 48. The output of this other flip-flop is connected through the end of the line switch in the head transport to the reset input of the flip-flop 48. The "0" output of the latter flip-flop 48 is connected to the reset input of the other flip-flop. Thus, the end character signal is stored in the other flip-flop until the end of the line is reached. The flip-flop 48 is then reset, causing the movement of head and document to stop, and the end character storing flip-flop to be reset. The next message is printed by the next of the print heads from the beginning of the next line after the start character is received.

The coordination of the printing, information handling and document transport functions is provided by a synchronizing arrangement including a rotary pulse generator 50 to be described in detail hereinafter in connection with FIGS. 9 to 12. Briefly, the generator 50 includes a rotatable wheel having circumferentially spaced magnetic and non-magnetic segments which are successively intercepted by magnetic pick-up heads. These pick-up heads provide a sequence of five pulses, *a, b, c, d* and *e* on five different lines. The rotatable wheel is coupled to the shaft of the motor 40 and is driven in synchronism with the head and document transports which are also driven by the same motor 40. The rotary pulse generator 50 serves several purposes which are: (1) To control the transfer of information from the register 10 into the decoder 16 and matrix 22 and, by controlling the transfer of information into the decoder, to control the document and head transport mechanisms; (2) To control the read out of the matrix with proper timing; (3) To provide power to energize the print heads with proper timing; and (4) To provide electrical power for operating the component circuits of the system.

The pulses from the generator are relatively high power pulses. Each pulse may have a power of the order of 200 watts. The pulses are rectified by diodes 52 which are polarized to pass only those portions of the pulses which are of one polarity (for example, negative with respect to ground). A plurality of filter circuits 54, which may be R–C filters, are individually connected to each of the diodes 52 and provide a filtered D.C. power output. This D.C. power output is connected to power input terminals of the register 10, amplifiers 12 and other circuits of the system for providing operating power to these circuits.

The pulses *a, b c, d* and *e* are applied sequentially through diodes 56 to pulse shaping circuits 58. These pulse shaping circuits shape the pulses from the generator into sharp pulses which are sequentially applied to the columns of cores in the matrix 22 and cause the bits stored in these cores to be read out into the head driver circuits. The diodes 56 also serve to isolate the pulse shaping circuits 58 from the filter circuits and the head driver circuit 24.

The signals read out from the cores trigger or gate the head driver circuits 24. The high power pulses from the pulse generator 50 are transmitted through diodes 60 and the driver circuits 24 to the coils of the different head units of the print heads 26. The print heads are therefore energized by the pulses from the pulse generator 50.

The lagging portion of the last pulse *e* is generated after the matrix 22 is read out and the print head has been energized successively to print a character on the document. The lagging portion of the last pulse *e* therefore indicates that the printer is ready to print the next character and is used as the printer ready signal. It is fed through a diode 62 and an inverter circuit 64 to the gate circuits 14 and enables the gates to transmit the bits of the next character from the register 10. The next character is stored in the register 10 so that the character available signal is applied to one input of the gate circuits and the bit signals of the next character are applied to the second inputs of each of the gate circuits 14, awaiting the printer ready signal. The printer ready signal then enables the gate circuits 14 to transmit the next character to the decoder 16. The next character is printed when the succeeding cycle of pulses *a, b, c, d* and *e* is generated by the pulse generator 50.

*Physical characteristics of the printing apparatus*

Figure 2:
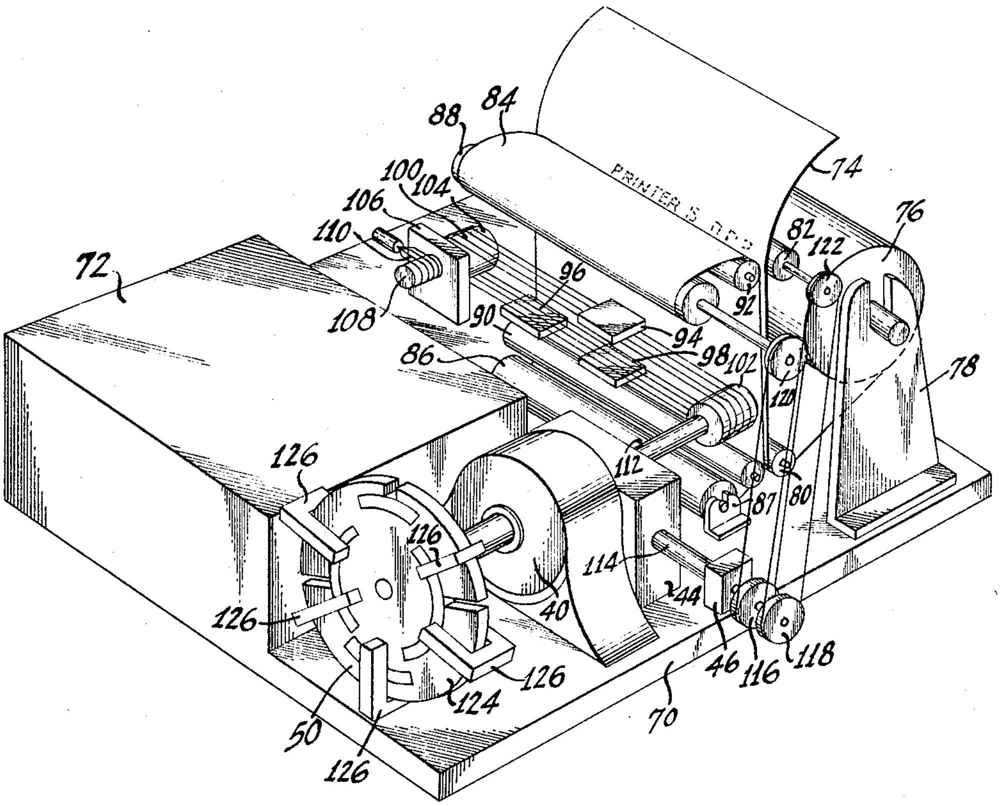
FIG. 2 is a perspective view illustrating one form of printer which may be used in the system of FIG. 1.

Referring to FIG. 2, there is shown a support plate or deck 70 on which the equipment illustrated in FIG. 1 is mounted. An important physical characteristic of the printer is its compactness. The entire printer, including the deck 70, may occupy a space of less than one cubic foot. The space requirement for the illustrated printer is considerably less than printers known in the art. An enclosure 72 on one corner of the deck 70 houses the electronic components of the printer system. The electronic components may be mounted on a plurality of printer circuit boards which are in parallel-spaced relationship in the enclosure 72. The cables between the electro-mechanical components of the printer and the circuit components within the enclosure 72 have been omitted in FIG. 2 in the interest of clarity of illustration.

The documents are printed on a sheet of paper 74 which is unwound from a reel 76 which is removably mounted in trunnions 78. The paper 74 is transported from the reel around a guide roller 80 and between the guide roller 80 and a feed roller 82.

Carbon paper 84 is transported from a supply reel 86 which may be removably mounted in trunnions 87 to take-up reel 88 along a path past a pair of guide rollers 90 and 92. The portions of the sheet of document paper 74 between the paper guide and feed rollers 80 and 82 and the portions of the sheet of carbon paper 84 between the carbon paper guide rollers 90 and 92 are maintained under tension and in contact with each other by the transport mechanism. While only one sheet of carbon paper 84 and one sheet of document paper 74 are shown in FIG. 2, multiple copies may be made either by having interleaved layers of carbon paper and document paper wound on the reel 76, or by using a plurality of reels of document paper and carbon paper and feeding the paper from the various reels in interleaved relation between the rollers, 80, 90, and 82, 92.

Three print heads 94, 96 and 98 are shown, by way of illustration, in the printer shown in FIG. 2. These print heads are carried on belts 100 of conductive material. Grooved plates (not shown) may be provided for guiding the print heads 94, 96 and 98. The belts 100 are trained around a pair of rollers 102 and 104 which are disposed beyond the opposite edges of the document paper and carbon paper. One of the rollers (the roller 102, for example) may have a sleeve of insulating material, such as polyurethane, which provides traction and equalizes the tension between the belts 100. This roller serves as a capstan for driving the belts 100. The other roller 104 is made of insulating material and has a plurality of contact rings in parallel-spaced relationship, each for making contact with a different one of the belts 100. The contact ring roller 104 is journaled in a bracket 106 mounted on the deck 70 so as to rotate freely with the belts 100 as they are driven by the capstan roller 102. An axial extension 108 of roller 104 is provided with a plurality of slip rings which are internally connected to different one of the contact rings on the periphery of the roller 104. Brushes 110 make contact with the rings on the extension 108. Signals are applied from the head driver circuits 24 (FIG. 1) through the brushes 110, and the conductive belts 100 to the print heads 94, 96, and 98.

Figure 3:
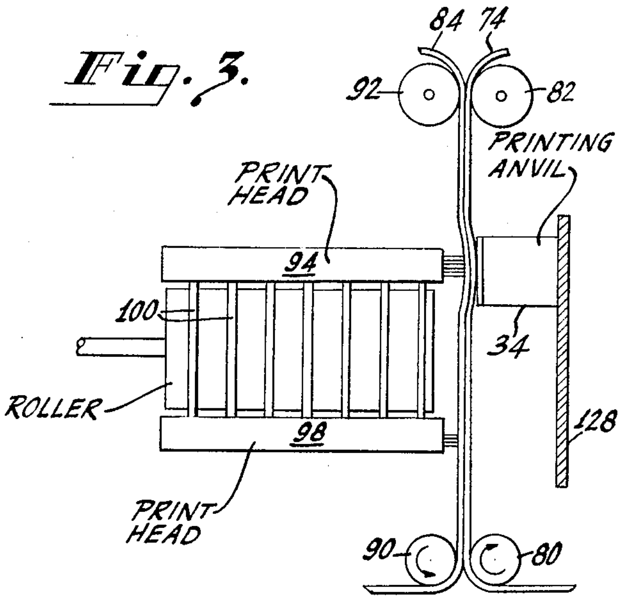
FIG. 3 is an end view of a portion of the mechanism shown in FIG. 2.

Only the one of the print heads which is printing a line of characters on the document paper 74 is disposed opposite the anvil 34 (see FIGS. 1 and 3). Even though the other print heads 98 and 96 are energized, they do not print, since they are not opposed by the anvil 34. The brushes 110 are connected to the head driver circuits 24 in the enclosure 72 by means of a cable.

The carbon paper transport, document paper transport, and the print heads transport are all driven by the same electrical drive motor 40. The speed reduction mechanism 42 may be coupled to one end of the motor shaft and may be contained within the housing of the motor 40. The electromagnetic clutch 44 is driven by the output shaft of the speed reduction mechanism 42. Connected to the electromagnetic clutch may be gearing, such as beveled gears, which have a pair of output shafts 112 and 114. The shaft 112 is connected to the capstan roller 102, and the shaft 114 is connected to the speed reduction mechanism 46 which may include a plurality of spur gears. The output shaft of the speed reduction mechanism has a pair of pulleys 116 and 118 which are, respectively, belt-coupled to other pulleys 120 and 122. The pulley 120 drives the carbon paper take-up reel 88. The other pulley 122 is coupled to the feed roller 82 which may be spring-biased toward the carbon paper feed roller 92 so as to hold the document paper 74 and carbon paper 84 in contact with each other. When the pulley 122 is rotated, the feed roller 82 drives the carbon paper 84 and document paper 74 and maintains the length of carbon paper 84 and length of the document paper 74 between the rollers 82, 92 and 80, 90 under tension. Thus, when the styli of the print heads 94, 96, 98 press the carbon paper against the document paper and the anvil, sharp, clear dots will be formed on the document paper. Suitable slip clutches may be provided between the pulley 120 and the carbon paper take-up reel 88 so that the carbon paper feed will not overrun the document paper feed by the feed roller 82, and the carbon paper will not slip with respect to the document paper. A tear-plate (not shown) may be located near the feed roller 82 for facilitating the removal of a printed page of the document paper 74. The rotary pulse generator 50 is mounted on the opposite end of the motor 40 from the electromagnetic clutch 44. The pulse generator 50 includes a wheel 124 which is rotated past five pick-up heads 126 mounted in fixed position by means of brackets (not shown). When the head rotates, sequences of five pulses are successively generated by different ones of the pickup heads. Since the drive motor rotates the wheel 124 of the pulse generator 50 and drives the print head transport and the carbon and document paper transports, all of the information handling, document feeding and printing functions are synchronized.

FIG. 3 shows the relationship between the print heads 94 and 98, the carbon paper 84, the document paper 74, and the printing anvil 34. The document paper 74 and the carbon paper 84 are juxtaposed along a path between the rollers 80, 90 and the rollers 82 and 92 and are driven in a direction from the rollers 80, 90 to the rollers 82, 92. The anvil 34 is mounted on a bracket 128 which may be fastened to the deck 70 (FIG. 2). The anvil 34 is opposite the upper reach of the conductive belts 100 and extends laterally across the papers. Only one of the three print heads is ever located along the upper reach of the belts 100 because the distance along the reaches of the belts is longer than the width of the papers 74 and 84 and because the speed of the belts is related to the speed feed of the papers by means of the speed reduction mechanism 46 and the pulley drives for the papers.

The other print heads 96 and 98 which are disposed along the reach of the belts 100 spaced below the anvil 34 may be mounted so that their styli are in contact with the uncoated side of the carbon paper. All of the print heads are energized simultaneously through the conductive belts 100. However, the styli of the other heads 96 and 98 do not print since they do not impact the papers against the anvil 34.

In FIG. 3, the print head 94 is on the upper reach of the belts. When the head 94 is activated, its styli impact the carbon paper 84 and document paper 74 against the anvil 34, thereby printing a column of dots by transferring the carbon from the carbon paper 84 to the document paper 74. After the print head 94 scans one line of the document paper 74, the next line of the document paper is advanced to a position adjacent the anvil 34 and the next print head 96 begins to scan the next line across the paper.

Figure 4:
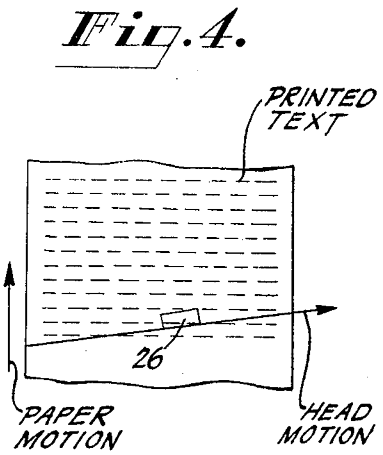
FIG. 4 is a diagram illustrating the printing of a document in the printer shown in FIG. 2.

As shown in FIG. 4, print heads move along a path slightly askew (e.g., 4° or 5°) to the direction of paper motion and to the edge of the papers. Since the papers and the heads move simultaneously, the characters are printed along a slant line. The slant of the printing line is compensated because the head motion is along a path askew to the direction of paper motion. The capstan roller 102 may be slightly higher than the slip ring roller 104 to provide the desired direction of head motion. Alternatively, the carbon paper and document paper reels 86 and 76 and their associated guiding and feeding rollers may be mounted at an angle to the path of the heads 94, 96 and 98.

*Print heads*

Referring to FIGS. 5 to 8, there is shown the construction of the print heads 94, 96 and 98. Since each of the print heads may be of similar construction, only the print head 94 is shown. The drawings are somewhat enlarged to clarify the illustration. The print heads may actually be very small (for example, 1½ inches long, 1 inch wide, ½ inch thick). Accordingly, the print heads may readily be mounted on the conductive belts 100 of the head transport and scanned across the sheets of carbon paper 84 and document paper 74. A pair of mounting frames 130 and 132 support the print head assembly. These frames are rectangular plates having central openings. Three tabs 134 project from one side of each of the frames 130 and 132. Seven print head units 136, 138, 140, 142, 144 and 148 are mounted in a vertically stacked array between the mounting frames 130 and 132. These print head units include magnetic core structures 150 which are essentially similar.

Figure 7:
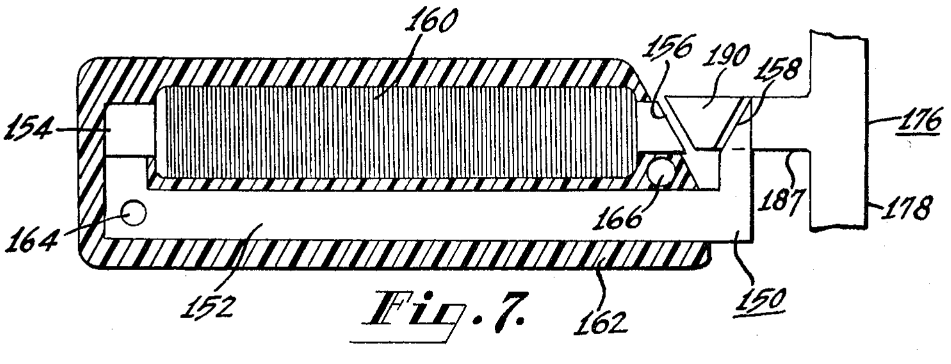
FIG. 7 is an enlarged, fragmentary view, partly in elevation and partly in section, showing the magnetic structure of an individual unit of the head illustrated in FIG. 5.
Figure 8:
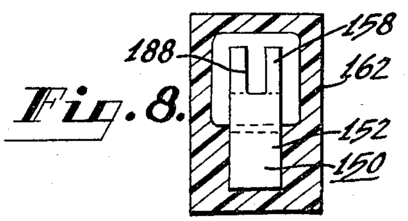
FIG. 8 is a fragmentary end elevational view of the magnetic structure shown in FIG. 7.

One of the magnetic core structures 150 is shown in FIGS. 7 and 8, and includes a pair of core sections 152 and 154 made up of laminations of magnetic material. A high permeability magnetic material such as an iron cobalt alloy may be used. Laminations of the material known as "Permendur" sold by the Allegheny Ludlum Steel Corporation of Pittsburgh, Pennsylvania is suitable. One of the core sections 158 is generally trapezoidal in shape and has a pole end 156 which is beveled at an angle of about 45°. The other core section 152 is U shaped and has two ends, one of which is a pole end 158 of the structure 150. The pole end 158 is also desirably beveled at an angle of about 45°, and is opposed to the pole end 156 to define an air gap therebetween which diverges outwardly of the structure 150. The opposite end of the U shaped core section 152 is in contact with the end of the core section 154 opposite to the pole end 156 thereof. A magnetic circuit is therefore defined around the magnetic structure 150.

This magnetic circuit is energized by a coil 160 which is wound around the core section 154. The coil 160 may alternatively be wound around the other core section 152. When current passes through the coil 160, magnetic flux is established in the structure 150 and across the air gap between the pole ends 156 and 158. Each of the magnetic structures 150 is individually encased in a body 162 of electrical insulating material. This may be accomplished by placing the structure 150, with the coil 160 wound thereon, in a mold and filling the mold with a potting compound, such as an epoxy potting resin. The mold is arranged so that the resin does not fill or otherwise interfere with the air gap. Mounting holes 164 and 166 are drilled, respectively, near one corner of the core section 152 and through the body 162 of insulating material in the opening between the core sections 152 and 154.

The magnetic structures 150 are mounted between the frames 130 and 132 on bolts 168 which extend through the mounting frames and through the holes 164 and 166 in the core structures 150 of the different head units 136, 138, 140, 142, 144, 146 and 148.

Figure 5:
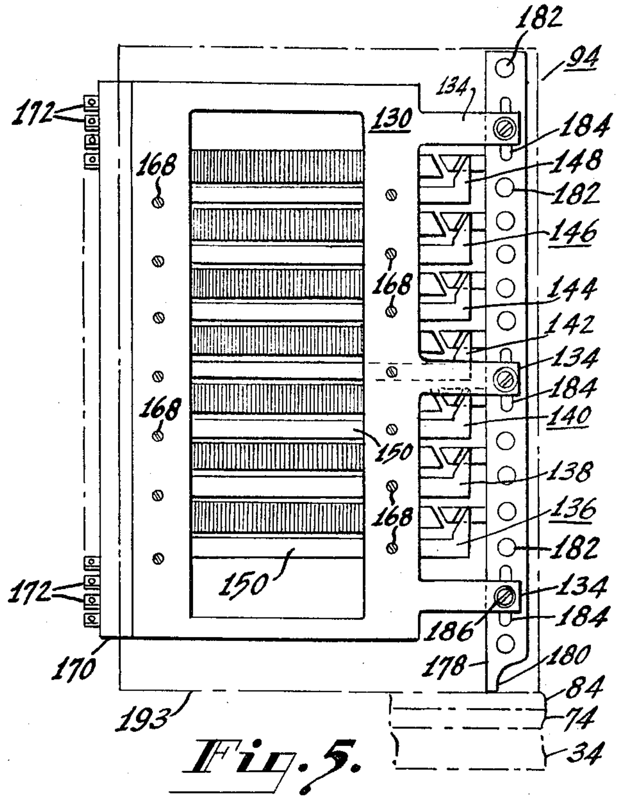
FIG. 5 is a front elevational view of a printing head which may be used in the printer illustrated in FIG. 2.

As shown in FIG. 5, a terminal strip 170 is secured along the back edge of the mounting frames 130 and 132. Leads (not shown) connect the ends of the coils 160 to different terminals 172 on the strip 170.

Figure 6:
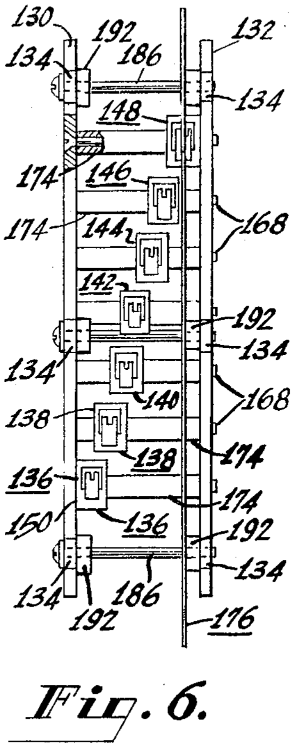
FIG. 6 is an end elevational view of the head shown in FIG. 5, as viewed from the right in FIG. 5, with certain parts removed to clarify the illustration.

As shown in FIG. 6, the magnetic structures 150 are mounted offset from each other in laterally spaced relation between the mounting frames 130 and 132. Bushings 174 around the bolts 168 maintain the structures 150 in desired offset, laterally spaced relationship.

Each of the head units 136, 138, 140, 142, 144, 146 and 148,, includes a separate stylus assembly. By the term "stylus" or "stylus assembly," as used herein, is meant any element which acts either by impact or in the manner of a stylus. The stylus assemblies 176 are in parallel, laterally spaced relationship, each cooperating with a different magnetic structure 150. Each of the stylus assemblies includes a flag 178 which has a tapered tip 180 for impacting the carbon paper 84 and the document paper 74 against the anvil 34. The respective flags 178 extend longitudinally the entire height of the print head 94 and have a plurality of holes 182 and three slots 184 therein. The holes serve to lighten the flags 178. Bolts 186 extending between the tabs 134 which project from the frames 130 pass through these slots 184 and support the flags 178 for longitudinal motion. Bushings 192 around the bolts 186 prevent sidewise, lateral movement of the stylus assemblies 176. Each flag 178 has a tab 187 which extends inwardly towards its associated magnetic structure 150 and through a slot 188 in the pole end 158 thereof (FIG. 8). A block 190 of magnetic material of trapezoidal shape (FIG. 7) is secured to the end of the tab 187. The block 190 may be made of a plurality of laminations of the same type of magnetic material as that from which the magnetic structure 150 is constructed. The magnetic block 190 is tapered outwardly towards the ouside of the magnetic structure 150 in a manner complementary to the 45° bevel of the pole ends 156 and 158. This angle of 45° provides for maximum and uniform magnetic forces on the block 190 over its travel.

The assembled frames 130, 132, magnetic structures 150 and stylus assemblies 176 may be mounted in a case 193, shown in phantom in FIG. 5. The tips 180 of the flags 178 may extend through a slot in the bottom of the case 193. The bottom of the case 193, as viewed in FIG. 5, is disposed in contact with the uncoated side of the carbon paper 84. The carbon paper 84 and the document paper 74 are maintained by the paper transport mechanism under stension as they pass the print head 94. The tips 180 of the flags 178 are normally in contact with the uncoated side of the carbon paper 84. The papers locate the magnetic blocks in the air gap between the pole ends 156 and 158 of the magnetic structure because of the dimensional relationship between the parts of the head. In other words, the paper acts as a stiff spring suspension for maintaining the stylus assemblies normally in their respective rest positions. Alternatively, a spring suspension for the stylus assemblies may be used.

When any of the coils 160 is energized, magnetic flux passes around the magnetic structure on which the energized coil is wound and across the air gap between its pole ends 156 and 158. A force related to the flux is exerted on the magnetic body 190 which tends to draw the magnetic body 190 downwardly into the air gap. The flag 178 of the stylus assembly 176 moves downward and impacts the papers 74 and 84 against the anvil 34. The movement of the stylus assemblies is perpendicular to the paper, since such perpendicular paths of movement are established by the slots 184 in the flags 178 and bolts 186 which pass therethrough.

The compact construction provided by the vertically stacked arrangement of magnetic structures 150 and the horizontally stacked arrangement of cooperating stylus assemblies 176, as well as the magnetic efficiency of the magnetic structures 150 and their cooperating magnetic blocks 194, provides for a compact and light weight electromagnetic print head which can be moved rapidly or scanned across a document for line-by-line page printing.

*Rotary pulse generator*

Figure 9:
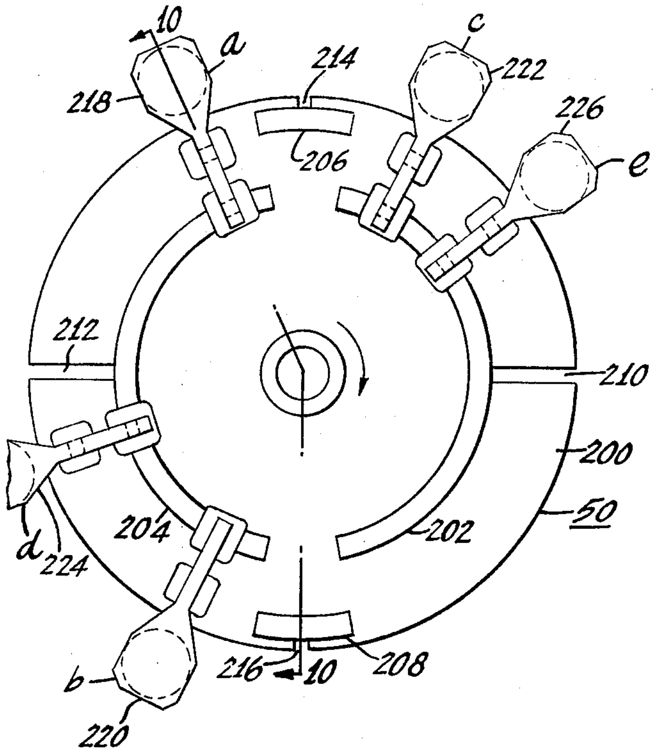
FIG. 9 is a front elevational view of a rotary pulse generator which is used in the printer shown in FIG. 2.
Figure 10:
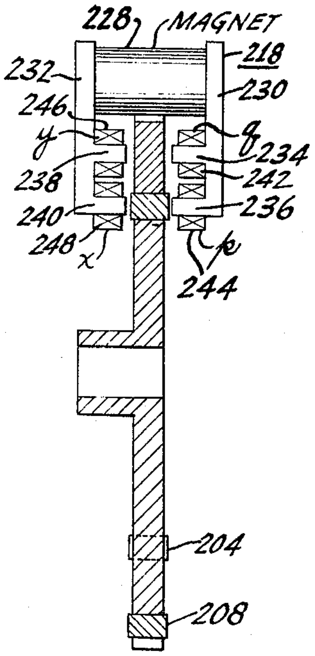
FIG. 10 is a sectional view of the generator shown in FIG. 9 taken along the line 10—10 in FIG. 9 and viewed in the direction of the appended arrows.

Referring to FIGS. 9 and 10, there is shown the rotary pulse generator 50 which is used to provide the succession of pulses *a, b, c, d* and *e* for controlling the read-out of information into the print heads 94, 96, 98 for energizing the print heads, and for timing the transfer of successive characters into the memory matrix 22 with the printing of the characters. The pulse generator also provides electrical power for operating the circuits of the printer system.

The pulse generator 50 includes a circular disk 200 of non-magnetic material, such as aluminum. Embedded in the disk are four arcuate sections 202, 204, 206 and 208 of magnetic material, such as an iron-nickel alloy. The sections 206 and 208 are relatively short and are disposed diametrically opposite each other near the outer periphery of the disk 200. The other sections 202 and 204 are disposed radially inwardly of, and angularly displaced from the sections 206 and 208 and are also diametrically opposite each other. The ends of the section 206 are along the same radial lines as the ends of the sections 202 and 204 which are adjacent thereto. Similarly, the ends of the other section 208 are along the same radial lines as the ends of the sections 202 and 204 which are adjacent thereto.

Slots 210 and 212 cut diametrically opposite each other in the edges of the disk 200 and extend to the sections 202 and 204, respectively. Another pair of diametrically opposite slots 214 and 216 are cut in the edge of the disk and extend to the magnetic sections 206 and 208, respectively. These slots break any closed circuits around the magnetic sections to which they extend and prevent the flow of eddy current in the disk 200 around these magnetic sections.

Five pick-up heads 218, 220, 222, 224 and 226 are disposed at angularly spaced locations around the circular disk 200 for generating the pulses *a, b, c, d* and *e* as the disk 200 rotates in a clock-wise direction as viewed in FIG. 9. The heads generate two sequences of pulses *a–e* for each cycle of rotation thereof, since there are two pairs of magnetic discontinuities between the sections 202, 204 and the sections 206, 208 of magnetic material. Alternate pulses are generated due to (1) the magnetic discontinuity between the sections 202, 204 and the section 206; and (2) the discontinuities between the section 208 and the sections 202 and 204. Since these discontinuities are 180° apart on the disk 200, allowance must be made therefor in spacing the five pick-up heads 218, 220, 222, 224 and 226. The first pulse *a* may, for example, be generated by the pick-up head 218. The next pulse *b* is generated by the pick-up head which is displaced 180° from the pick-up head 218 plus an additional 25.7°, which is the angular displacement between the five pulses which are to be generated at equal time intervals for each 180° of rotation of the disk 200. Thus, the next head 220 for generating the second pulse *b* is disposed 205.7° clock-wise from the first head 218. Similarly, the head 222, which generates the third pulse *c*, is 51.4° clock-wise from the first head 218. The fourth head 224, which generates the fourth pulse *d*, is 267.1° from the first head in a clock-wise direction. The fifth head 226 is 92.8° clock-wise from the first head 218 and generates the last pulse *e* of the sequence. If desired, only one pair of magnetic discontinuities may be provided. However, the use of two or more discontinuities is desirable, since the motor then need not rotate at very high speeds to accommodate the high speed printing of characters.

Figure 11:
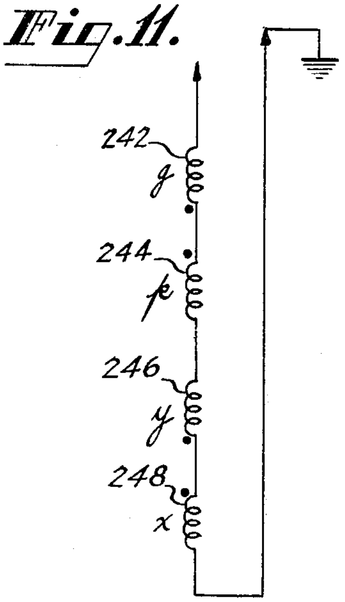
FIG. 11 is a schematic diagram showing the coil circuit of one pick-up head of the pulse generator shown in FIGS. 9 and 10.

The construction of the pick-up heads is similar, so that the head 218 is described herein for purposes of illustration, The head includes a permanent magnet 228 which may be in the form of a cylinder of an aluminum, nickel, cobalt, iron alloy, such as Alnico V sold by Indiana General Corporation of Valparaiso, Indiana and others. This magnet 228 is clamped between a pair of F-shaped core members 230 and 232 by bolts (not shown). The core member 230 has a pair of pole tips 234 and 236 which respectively oppose a pair of pole tips 238 and 240 of the other core member 232. Coils 242, 244, 246 and 248 are wound around the pole tips 234, 236, 238 and 240, respectively. The coils are interconnected, as shown in FIG. 11, so that the voltages which are generated thereacross are additively combined in the same sense.

In operation, when the disk 200 is moving in a clockwise direction, as viewed in FIG. 9, and the pick-up head 218 is in the position shown in the drawing, magnetic flux generated by the magnet 228 will flow between the pole tips 236 and 240, rather than between the pole tips 234 and 238, since the section 204 of magnetic material is disposed between the pole tips 236 and 240 and the magnetic path through these pole tips has much less reluctance than the magnetic path between the pole tips 234 and 238. As the inner magnetic section 204 moves out from between the pole tips 236, 240, the outer magnetic section 208 moves in between the other pole tips 234, 238. The magnetic flux is then switched abruptly from one set of pole tips 236, 240 to the other set of pole tips 234, 238. Voltage pulses polarized in one sense are then generated by the coils 244 and 248, while voltage pulses polarized in the opposite sense are generated in the coils 242 and 246 as will shortly become apparent. As shown in FIG. 11, the coils 244, 248 are connected in series aiding relationship, as are the coils 242 and 246. The coils 242 and 246 are connected in opposing relationship to the coils 244 and 248, all for the same direction of magnetic flux therethrough. Accordingly, by interconnecting the pairs of coils 242, 246 and 244, 248 in opposition, the voltage generated across the output terminals of these coils is of the same polarity (for example, positive).

Figure 12:
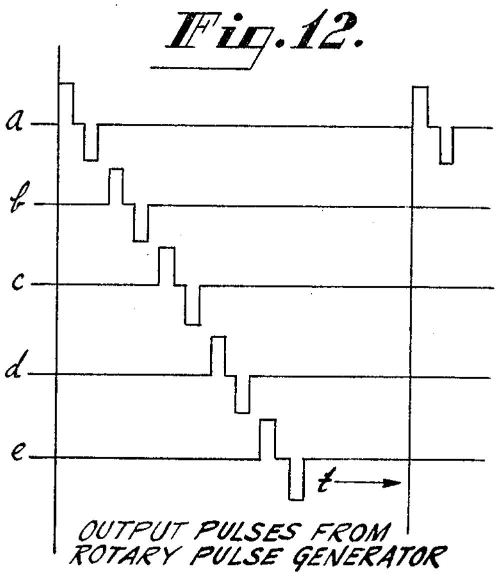
FIG. 12 is a timing chart showing the time relationship among the pulses generated by the pulse generator shown in FIGS. 9 and 10.

As the disk 200 continues to rotate, the outer magnetic section 208 moves out from between the pole tips 234, 238 while the inner magnetic section 202 moves in between the pole tips 236, 240. The voltages generated by the series connected pick-up coils 242, 244, 246 and 248 will therefore be of the same polarity, but in this case negative. It follows, therefore, that a sequence of pulses of alternating polarity, first positive and then negative, is generated by the pick-up heads 218, 220, 222, 224 and 226. These pulses are shown in FIG. 12. The pulse may be of very high power, since a large magnetic flux density (for example, 5,000 gauss per $cm.^2$) may be switched through coils having many turns of wire. The electrical power of each voltage pulse may be 200 watts. Accordingly, when these pulses are rectified by the rectifier diodes 52 (FIG. 1) and filtered by the filter circuit 54, sufficient power for operating the electrical circuits of the printer may be developed.

*Magnetic memory matrix and print-head driver circuit*

Referring to FIG. 13, the magnetic matrix memory 22 includes thirty-five cores arranged along rectangular coordinates in five columns and seven rows. The cores in the rows are linked by separate output windings 250, 252, 254, 256, 258, 260 and 262. The cores in the columns are linked by separate read-out windings 264, 266, 268, 270, and 272. Input windings are threaded through the cores to form a pattern corresponding to each character which may be printed. Each input winding is connected to a different output line from the decoder. An input winding 273 for the letter "A" is illustrated by way of example. The other input windings are not shown in order to clarify the illustration. The magnetic cores are of the type which can be set in one magnetic state by magnetomotive forces in one sense provided by their linking windings and reset into the opposite magnetic state by magnetomotive forces also provided by these windings in the opposite sense. The cores remain set until they are reset. The input windings are threaded through the cores in a manner such that when they are energized by a pulse from the decoder, the cores through which the input windings are threaded are set.

The read-out windings 264, 266, 268, 270 and 272 are connected to the pulse shaper 58 which applied the pulses *a, b, c, d* and *e* successively thereto to successively reset the cores in the columns. After application of the read-out pulses, all of the cores are reset. Accordingly, the cores are initially in reset condition and are selectively set by the input pulses from the decoder.

When an input pulse arrives on the input winding 273, the cores in the bottom five rows of the first (left-hand) column are set. Similarly, the other cores in the other columns which are threaded by the input winding 274 are set. The other cores remain in reset condition. When the read-out pulses are applied, the columns are reset successively. The first column cores are reset first, followed by the other cores in the other columns until the right-hand column is finally reset by the last read-out pulse *e*. The cores which are switched from set to reset condition generate an output pulse on the output windings 250, 252, 254, 256, 258, 260 and 262 which are linked thereto.

These output pulses are applied to the head driver circuits 24. The head driver circuits include matching transformers 274, 276, 278, 280, 282, 284 and 286 which couple the output windings to the gate electrodes of different silicon controlled rectifiers (SCR's) 288, 290, 292, 294, 296, 298 and 300. These silicon control rectifiers have anode electrodes which are connected to the cathodes of the diodes 60 and cathode electrodes which are connected to the coils of the head units of the print-heads 94, 96, 98 (FIG. 2). The coils of these print-heads are individually shunted by diodes 302 which damp any transient currents which flow in the direction opposite to the driving currents therethrough. The diodes 60 are connected to the rotary pulse generator and polarized to pass the positive portions of the generated pulses through the SCR's when the latter are triggered into their conductive states by voltages from the transformers 274, 276, 278, 280, 282, 284 and 286.

For example, when the first pulse *a* is applied to read-out the first column of cores of the matrix 22, the last five cores are switched from set to reset condition. Output pulses then appear on the output windings 254, 256, 258, 260 and 262. These pulses are applied to the gate electrodes of the SCR's 292, 294, 296, 298 and 300 by the transformers 278, 280, 282, 284 and 286 which match the impedance of the output windings to the input impedance presented by the SCR gate electrodes. Simultaneously, the pulse *a* is applied from the rotary pulse generator to all of the anode electrodes of all of the SCR's.

The bottom five of the SCR's 292, 294, 296, 298 and 300, which have gate pulses applied thereto, are triggered into their conductive states and pass the positive pulses from the rotary pulse generator through the coils of the print-head 94. The lowermost five head units of the print-head 26 are therefore energized and drive their styli into the carbon paper 84 and the document paper 74 so as to print a column of five dots which forms the first leg of the letter "A," (see FIG. 14). At the termination of the first pulse *a*, the SCR's are rendered non-conductive and are ready to receive the pulses from the second column of cores, when the next pulse *b* is applied to the read-out winding 266.

Referring again to FIG. 1, it will be noted that the last pulse *e* from the pulse generator 50 is coupled through the diode 62 which passes only the negative portion thereof. This negative portion occurs after the positive portion of the last pulse *e* and is indicative of the completion of printing of a character by the print-head 26. This pulse is inverted in the inverter circuit 64 and applied in proper polarity to the gate circuits 14. The gate circuits 14 are thereby notified that the matrix is reset and is ready to accept the next character. The gate circuits are then enabled to pass the next character to the decoder 16. The decoder applies a pulse to the one of its output windings corresponding to the next character. The cores in the matrix linked to the decoder output winding are then set. When the next sequence of pulses is generated by the rotary pulse generator 50, the next character is read-out from the matrix and printed on the document.

From the foregoing description, it will be apparent that there has been provided an improved system for translating information into legible form and for printing successive characters which are represented by electrical signals which carry digital information. While the system has been described as capable of accepting input data asynchronously, synchronous operation may be provided by deriving a timing pulse simultaneously with the arrival of each character of the input data. This timing pulse may be used to control a suitable servo mechanism which will synchronize the speed of rotation of the rotary pulse generator with the incoming characters so that the generation of a succession of pulses from the pulse generator will be initiated as soon as the characters are stored in the matrix. A feedback pulse may be derived, for example through the diode 62 (FIG. 1) after a character is printed. This feedback pulse may be applied to a servo mechanism and used together with the timing pulses from the input data to synchronize the speed of the rotary pulse generator 50 with the incoming data. Other variations and modifications in the disclosed apparatus, and in the various components thereof, all coming within the scope of the present invention, will undoubtedly suggest themselves to those skilled in the art. Accordingly, the foregoing description should be taken merely as illustrative and not in any limiting sense.

What is claimed is:

1. Apparatus for printing a message represented by successively presented input characters of digital information comprising (a) decoder means responsive to said characters of digital information and having a plurality of output lines each of which is energized in response to a different input character of digital information, (b) a memory matrix having a plurality of memory elements arranged in a plurality of columns and rows, (c) memory matrix input means coupled to said decoder means output lines for conditioning different ones of said memory elements which describe the character corresponding to an energized one of said lines, (d) a printing device having a plurality of electromagnetic units each corresponding to a different one of said matrix rows and each including a stylus for forming a dot of a pattern of dots representing said characters, (e) a rotary pulse generator for repetitively generating sequences of electrical pulses corresponding in number at least to the number of said columns in said memory matrix, (f) a plurality of gate circuits each having a pair of inputs and an output, said output and one of said inputs of different ones of said gate circuits, respectively being connected to corresponding ones of said printing device units and said matrix rows, (g) means for applying each electrical pulse simultaneously to the other of each of said gate circuit inputs, (h) means for applying said pulses to said memory matrix for successively reading out said matrix column by column, into said gate circuits for enabling those of said gate circuits having a conditioned one of said elements of said matrix connected thereto, and (i) means responsive to the last of each of said sequences of pulses for applying a next succeeding one of said characters to said decoder means.

2. Apparatus for printing a message, represented by successively applied characters of digital information, on a document, said apparatus comprising (a) transport means for feeding said document along a path, (b) a print head including a plurality of electrically operative drive units having individual styli disposed to impact said document when their respective drive units are electrically energized, (c) means for transporting said print head along a path across said document to scan successive lines of said document, (d) a rotary pulse generator for cyclically generating successive pluralities of electrical pulses, (e) a memory matrix having a plurality of information storage units arranged in a plurality of columns and a plurality of rows, (f) means responsive to an input character of said digital information for setting ones of said storage units in a pattern corresponding to the printed form of the character represented by said digital information, (g) a single electric motor for rotating said pulse generator and for simultaneously operating said document transport means and said head transport means, (h) a plurality of gate means each having an output coupled to a different drive unit, a first input coupled to receive each of said pulses, and a second input, (i) means responsive to individual pulses from said pulse generator for successively reading out sucessive columns of said matrix whereby output signals are provided from each row of said matrix having a set storage unit, and (j) means coupling the output signals from each different matrix row to the second input of a different one of said gate means.

3. Apparatus for printing a message represented by successively presented input characters of digital information on a sheet of document paper backed by a sheet of carbon paper, said apparatus comprising (a) transport means for feeding said carbon paper and said document paper in juxtaposition with each other along a path, (b) a plurality of print heads each including a plurality of electromagnetic drive units and individual styli actuable by the respective drive units, (c) means for transporting each of said plurality of print heads successively along a path substantially transverse to the path of said document paper and said carbon paper, said print head transport means including a plurality of belts of conductive material, a pair of rollers disposed in spaced relation opposite different edges of said juxtaposed papers, said belts being arranged in parallel spaced relationship around said rollers, said units of said print heads being connected separately to different ones of said belts, and contactor means for applying signals to said units through said belts, (d) an anvil cooperative with said heads, said anvil and said heads and belts being disposed on opposite sides of said juxtaposed papers, said anvil being opposite only one of the reaches of said belts, (e) a rotary pulse generator for cyclically generating successive pluralities of electrical pulses, (f) a memory matrix having a plurality of information storage units arranged in a plurality of columns and a plurality of rows, the number of rows being equal to the number of styli in a print head, (g) means responsive to individual characters of said digital information for setting different ones of said storage units in a pattern corresponding to the form of the character represented by said digital information, (h) means including a synchronous motor for rotating said pulse generator and for driving said carbon paper and document paper transport means and for driving one of said rollers whereby to drive said conductive belts and scan said print heads each across a succeeding line on said papers, (i) gate means for applying said pulses from said pulse generator through said brush means to different ones of said units of said print heads, (j) means responsive to individual pulses from said pulse generator for successively reading out successive columns of said matrix and for providing output signals from each row of said matrix columns having a set storage unit to enable a respective one of said gate means to apply a pulse to the head units corresponding to those matrix rows having set storage units, and (k) means responsive to the last pulse of each of said pluralities of pulses for applying the next character of said digital information to said matrix.

4. In a matrix printer for printing a line of characters on a document, wherein a character is formed by printing marks on a document at selected ones of M rows in N successively printed columns of an assumed character print matrix, the combination of:

(a) a set of M printer elements, one for each of said M rows;

(b) separate energizing means for each of said printer elements;

(c) an anvil disposed opposite said printer elements and being spaced therefrom to define a document receiving zone;

(d) means for moving a document in a first coordinate direction through said document receiving zone;

(e) memory means comprising a plurality of memory elements functionally arranged in M rows and N columns corresponding to the M rows and N columns of the character print matrix;

(f) a plurality of inputs to said memory, each of said inputs being coupled to a different combination of said memory elements;

(g) M row output lines for said memory, each of said row output lines being coupled to the energizing means for a different one of said printer elements;

(h) means operative to move one of said anvil and said set of printer elements in a direction which is parallel to the plane of the document at said receiving zone and transverse to said first coordinate direction;

(i) a pulse generator operated in synchronism with the last-mentioned said means; and (j) means responsive to the outputs of said pulse generator for reading out said memory elements column-by-column.

5. The combination as claimed in claim 4, including decoder means having a plurality of output lines each coupled to a different one of the inputs to said memory, and means responsive to an output from said generator transmitting a coded character to said decoder after the application of a pulse from said generator to the last column of said memory.

6. In a matrix printer, the combination comprising:

(a) a set of M printer elements, and separate actuating means therefore;

(b) an anvil disposed opposite said printer elements and being spaced therefrom to define a document receiving zone;

(c) M gate circuit means each having its output coupled to a different one of said actuating means;

(d) a memory having a plurality of bistable memory elements functionally arranged in M rows and N columns for storing the information for character to be printed;

(e) M row output lines in said memory each being coupled to one input of a different one of said gate circuit means;

(f) a plurality of inputs to said memory, each of said inputs being coupled to set a different combination of said memory elements;

(g) drive means mechanically coupled to move one of said anvil and said set of printer elements relative to the other in a direction parallel to said document-receiving zone;

(h) a pulse generator operated in synchronism with said drive means;

(i) means responsive to the outputs of said pulse generator for reading out said memory by resetting the elements in said memory a column at a time; and (j) means for applying each output of said pulse generator to a second input of each of said gate circuit means.

7. The combination as claimed in claim 6, wherein each gate circuit means comprises a device having first and second electrodes defining a current path and having a control electrode, said device having thyratron-like characteristics, and wherein one of the first and second electrodes is coupled to the associated actuating means, the other one of the first and second electrodes is coupled to receive each of the outputs of said pulse generator, and the control electrode is coupled to the associated row output line in the memory.

8. The combination as claimed in claim 6, wherein said pulse generator is a rotary pulse generator having M cyclically and successively energized pickup devices, wherein the output of each different one of a plurality of said pickup devices is applied to read out the elements in a different column of the memory, and wherein the outputs of all of the said plurality of pickup devices are applied to the second input of each gate circuit means, said combination further including a decoder having a plurality of outputs each coupled to a different one of said memory inputs, and means responsive to the output of a given one of the pickup devices for transferring to said decoder information for the next character to be printed.

References Cited by the Examiner

UNITED STATES PATENTS

| | | | |
|---|---|---|---|
| 2,702,380 | 2/1955 | Brustman | 178—26.5 |
| 2,850,566 | 9/1958 | Nelson | 178—23 |
| 2,933,559 | 4/1960 | Campbell | 178—30 |
| 2,982,951 | 5/1961 | Dirks | 178—26.5 |

THOMAS B. HABECKER, *Acting Primary Examiner.*